(12) United States Patent
Fujii (10) Patent No.: US 8,099,065 B2
(45) Date of Patent: Jan. 17, 2012

(54) TRANSMITTING APPARATUS AND METHOD

(75) Inventor: Masaki Fujii, Kasugai (JP)

(73) Assignee: OMRON Corporation, Kyoto (JP)

( * ) Notice: Subject to any disclaimer, the term of this patent is extended or adjusted under 35 U.S.C. 154(b) by 759 days.

(21) Appl. No.: 12/170,759

(22) Filed: Jul. 10, 2008

(65) Prior Publication Data

US 2009/0017781 A1    Jan. 15, 2009

(30) Foreign Application Priority Data

Jul. 12, 2007   (JP) ................................. 2007-182905

(51) Int. Cl.
*H01Q 11/12* (2006.01)
*H04B 1/04* (2006.01)

(52) U.S. Cl. .................. 455/127.1; 455/127.5; 455/123; 455/117; 455/109; 455/41.3; 343/712; 343/713

(58) Field of Classification Search ............ 455/91–129, 455/41.2, 41.3; 343/711–717
See application file for complete search history.

(56) References Cited

U.S. PATENT DOCUMENTS

| | | | | |
|---|---|---|---|---|
| 4,168,468 A | * | 9/1979 | Mabuchi et al. ........... | 340/12.16 |
| 4,996,525 A | * | 2/1991 | Becker et al. ............. | 340/5.64 |
| 6,496,153 B2 | * | 12/2002 | Boulesteix ................ | 343/713 |
| 2002/0014859 A1 | * | 2/2002 | Boulesteix ................ | 315/219 |
| 2003/0222756 A1 | | 12/2003 | Shimonomoto et al. | |
| 2005/0259773 A1 | | 11/2005 | Fay | |
| 2006/0012462 A1 | | 1/2006 | Teshima et al. | |
| 2006/0038661 A1 | | 2/2006 | Reinhold et al. | |
| 2006/0132325 A1 | * | 6/2006 | Fujii et al. ................ | 340/825.69 |

FOREIGN PATENT DOCUMENTS

| | | |
|---|---|---|
| FR | 2 864 379 A1 | 6/2005 |
| JP | 2003-269023 A | 9/2003 |

OTHER PUBLICATIONS

Extended European Search Report for European Application No. 08158382.5-2411 dated Mar. 16, 2010, 5 pages.
Abstract of JP2003-269023, published on Sep. 25, 2003; data supplied from the esp@cenet Worldwide database, 1 page.

* cited by examiner

*Primary Examiner* — Edward Urban
*Assistant Examiner* — Rui Hu
(74) *Attorney, Agent, or Firm* — Osha • Liang LLP

(57) ABSTRACT

Communication with less noise is to be performed. A voltage value control signal functioning as an instruction to change the voltage value supplied from a voltage converting section to an LFI is output from a CPU. A driving section for the LFI outputs the control signal at 125 kHz that drives an FET circuit section according to the voltage value supplied from an ECU. The FET circuit section outputs the driving current for an antenna under the control of the driving section. A connecter terminal that connects to a harness is connected to a connecter terminal for GND connection along with the GND terminal of the voltage converting section. A connecter terminal that connects to a harness is connected to a connecter terminal for GND connection along with the GND terminal of the FET circuit section.

4 Claims, 6 Drawing Sheets

TRANSMITTING APPARATUS AND METHOD

BACKGROUND OF INVENTION

1. Field of the Invention

The present invention relates to a transmitting apparatus and method, and more specifically, it relates to a transmitting apparatus and method that allow communication with less noise.

2. Description of Related Art

In recent years, a so-called passive entry system that performs hands-free locking and unlocking automatically, for example, has been in practical use as an entry system for vehicles, and the wider spread in the future is being expected (refer to JP-A-2003-269023 (Patent Document 1), for example). This automatically implements operations (unlocking/locking operations) by a locking mechanism for a vehicle door by controlling a vehicle-mounted machine by performing bidirectional wireless communication between a portable machine, which can be carried by a user, and the vehicle-mounted machine to check the authenticity of the portable machine and analyze the position of the portable machine, for example, based on electromagnetic waves (signal) received from the portable machine by the vehicle-mounted machine.

The future wide spread of a TPMS (tire pressure monitoring system) that detects the air pressure of a tire and alarming a user if any abnormality exists is also expected. This performs bidirectional wireless communication between a sensor that senses the air pressure of a tire and a vehicle-mounted machine, determines an abnormality in air pressure, for example, based on electromagnetic waves (signal) received from a sensor by a vehicle-mounted machine and outputs an alarm with an indicator or by voice as required.

In a passive entry system or a TPMS, an antenna connecting to a vehicle-mounted machine is placed at a predetermined position in a vehicle, and communication is performed between the vehicle-mounted machine and the portable machine or sensor by transmitting a signal of LF (Low Frequency) waves (at 100 to 200 KHz, for example) to the portable machine or a sensor as required and receiving the signal transmitted from the portable machine or sensor by the antenna.

In a passive entry system or a TPMS, a distance to some extent exists between the position where an antenna is placed and the position where an ECU (Electronic Control Unit) is placed that generates signals and performs various kinds of control. For that reason, when a driving circuit that drives an antenna is provided in the ECU (Electronic Control Unit), the driving circuit and the antenna are connected through two harnesses. A large amount of current for driving the antenna flows through the harnesses. This causes unnecessary radiation noise, which may cause noise in radio and/or may have an adverse effect to operations by other electronic machines installed in the vehicle. In other words, the integral configuration of the driving circuit that drives the antenna and the ECU is not desirable, and the driving circuit is generally integrated with the antenna.

For that reason, the ECU and the driving circuit must be connected through three harnesses of a power supply line, a ground line and a signal line, which means an increase in number of harnesses. However, the increase in number of harnesses has an influence on the structure and/or production costs of vehicles.

SUMMARY OF THE INVENTION

The invention has been made in view of those situations and allows communication with less noise.

A transmitting apparatus according to the invention is a transmitting apparatus that transmits an LF signal from an antenna by controlling an antenna driving section connecting to a control section through a harness by the control section, the control section having voltage control means for outputting a control signal based on a signal to be transmitted, and voltage supplying means for supplying a predetermined voltage to the antenna driving section for a predetermined period of time based on a control signal output from the voltage control means, the antenna driving section having transistor driving control means for controlling the driving of a transistor that outputs driving current to the antenna based on the value of the voltage supplied from the voltage supplying means through the harness.

The voltage control means may be configured by a CPU, for example. The transistor driving control means may be configured as an electronic circuit, for example, and may be configured by an FET driving circuit and an output permitting circuit that outputs a control signal to drive or stop the FET driving circuit.

In the transmitting apparatus of the invention, a control signal is output from the control section based on the signal to be transmitted, and a predetermined voltage is supplied to the antenna driving section for a predetermined period of time based on the output control signal. The driving of the transistor that outputs driving current to the antenna is controlled by the antenna driving section based on the value of the voltage supplied from the voltage supplying means through the harness.

Therefore, the occurrence of radio noise due to the LC resonance with a signal at a predetermined frequency due to the driving current for the antenna can be suppressed, and the increase in number of harnesses can be suppressed, without requiring flowing the driving current for the antenna, which is a signal of large current, through the harness.

The transistor driving control means may have voltage Duty control means for controlling the driving of the transistor to change the Duty Rate or voltage of the signal to be transmitted from the antenna based on the value of the voltage supplied from the voltage supplying means through the harness. In this case, the voltage control means may cause the voltage supplying means to supply voltage corresponding to the Duty Rate or voltage of the signal to be transmitted from the antenna to the antenna driving section.

The transistor driving control means may perform ASK (Amplitude Shift Keying) modulation on the signal corresponding to the change in value of the voltage supplied from the voltage supplying means based on the signal supplied from a signal generating section that generates a signal at a preset frequency and can generate a control signal to drive the transistor.

The transmitting method according to the invention is a transmitting method of transmitting an LF signal from an antenna by controlling an antenna driving section connecting to a control section through a harness by the control section, the control section having voltage control means for outputting a control signal based on a signal to be transmitted, and voltage supplying means for supplying a predetermined voltage to the antenna driving section for a predetermined period of time based on a control signal output from the voltage control means, the antenna driving section having transistor driving control means for controlling the driving of a transistor that outputs driving current to the antenna based on the value of the voltage supplied from the voltage supplying means through the harness, wherein the control section supplies a predetermined voltage to the antenna driving section for a predetermined period of time based on the signal to be transmitted, and the antenna driving section controls the driving of the transistor that outputs driving current to the antenna based on the value of the voltage supplied from the voltage supplying means through the harness.

In the transmitting method of the invention, a control signal is output from the control section based on the signal to be transmitted, and a predetermined voltage is supplied to the antenna driving section for a predetermined period of time based on the output control signal. The driving of the transistor that outputs driving current to the antenna is controlled by the antenna driving section based on the value of the voltage supplied from the voltage supplying means through the harness.

Communication with less noise can be performed according to the invention.

DESCRIPTION OF PREFERRED EMBODIMENTS

With reference to drawings, embodiments of the invention will be described below.

Figure 1:
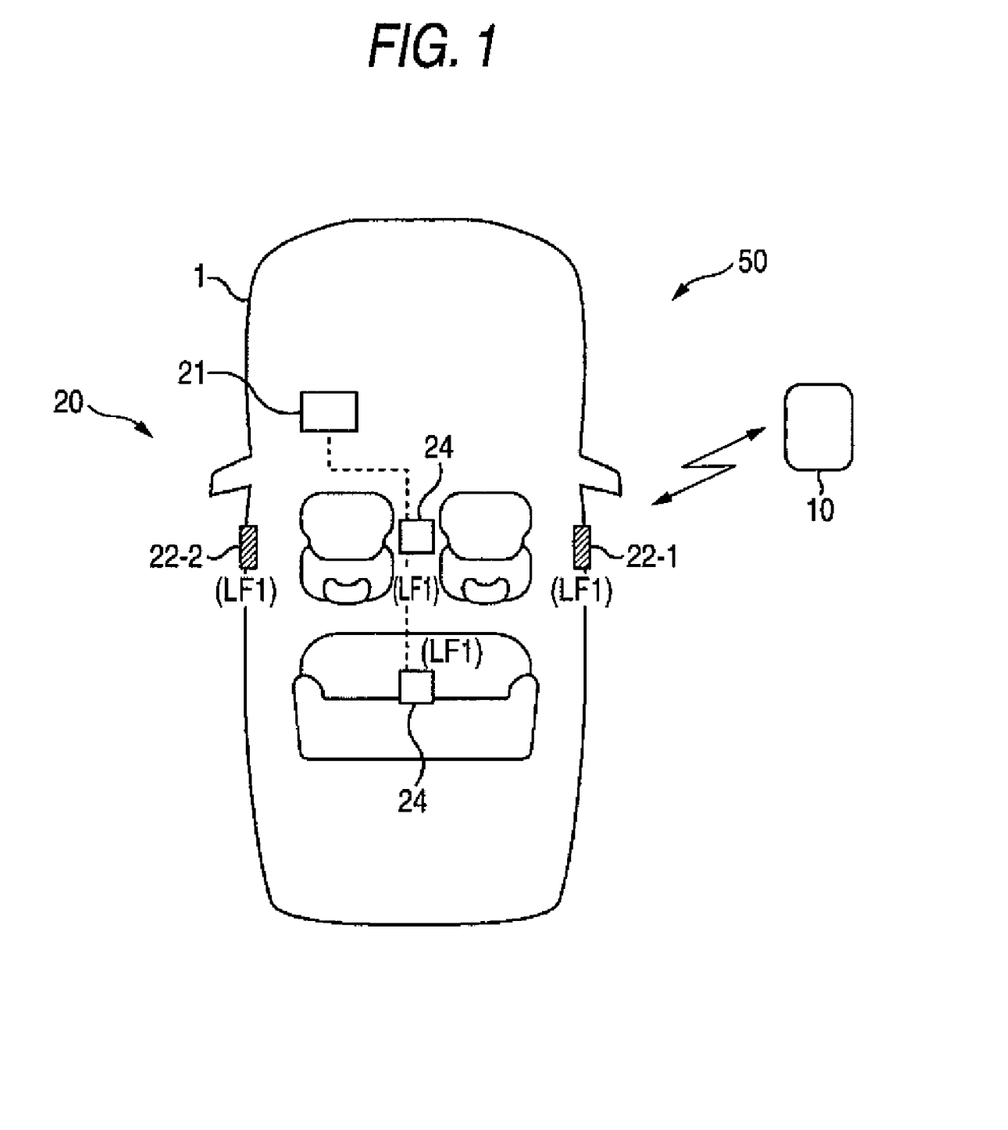
FIG. 1 is a diagram showing a configuration example according to an embodiment of a communication system to which the invention is applied.

FIG. 1 is a diagram showing a configuration example according to an embodiment of the communication system to which the invention is applied. The figure shows an example in which a communication system 50 of the invention is applied to a 4-door vehicle 1 as a passive entry system that automatically implements operations (unlocking/locking operations) by a locking mechanism for a vehicle door by controlling a vehicle-mounted machine 20 by performing bidirectional wireless communication between a portable machine 10, which can be carried by a user, and the vehicle-mounted machine 20 to check the authenticity of the portable machine and analyze the position of the portable machine, for example, based on electromagnetic waves (signal) received from the portable machine by the vehicle-mounted machine. The communication system 50 is configured by the portable machine 10 and the vehicle-mounted machine 20 installed in the vehicle 1.

As antennas for the vehicle-mounted machine 20, doorknob antennas 22-1 and 22-1 provided at doorknobs of doors and an interior antenna 24 provided within the vehicle 1 are provided. Low frequency waves at an LF zone (such as 100 to 200 KHz) are used for the communication between the vehicle-mounted machine 20 and the portable machine 10.

The portable machine 10 has a communication section having an internal antenna and/or a transmitting circuit as means for wireless communication with the vehicle-mounted machine 20 and internally has a control circuit including a microcomputer that implements control processing on the entire portable machine and an internal battery. A switch (not shown), that is a press-button type operating section, is provided on an operating surface of the portable machine 10.

The vehicle-mounted machine 20 is configured to perform processing of locking/unlocking a door of the vehicle 1, processing of opening a door or the boot and so on by exchanging a predetermined signal with the portable machine 10. The vehicle-mounted machine 20 is configured by an ECU (Electronic Control Unit) 21 that performs processing of locking/unlocking a door of the vehicle 1 and operational processing for performing processing of opening a door or the boot, for example, outputs a control signal and controls the driving of the antennas, the doorknob antennas 22-1 and 22-2 and the interior antenna 24.

For example, an LFI (LF initiator) is provided that connects to the antennas including the doorknob antennas 22-1 and 22-2 and the interior antenna 24 and drives the antennas to transmit an LF signal from the antennas. The LFI may be configured integrally to each of the antennas.

According to the invention, the LFI is configured integrally to each of the antennas. The term "integrally" includes a case where the LFI is placed near each of the antennas in a separate cabinet in addition to a case where the LFI is placed within a same cabinet.

Figure 2:
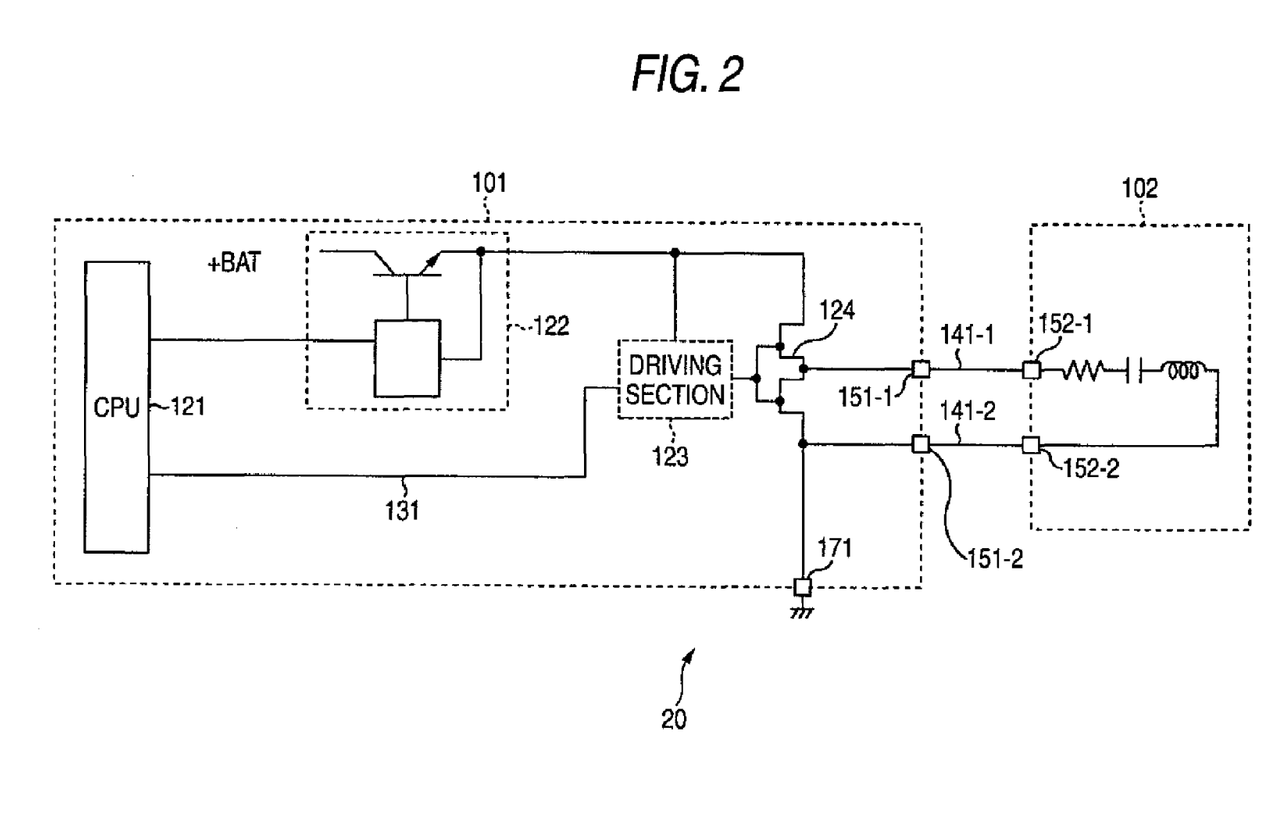
FIG. 2 is a block diagram showing a detail configuration example of an existing vehicle-mounted machine.

FIG. 2 is a block diagram showing a detail configuration example of an existing vehicle-mounted machine 20. As shown in the figure, an ECU 101 (corresponding to the ECU 21 in FIG. 1) on the left side of the figure and an LFI 102 on the right side in the figure are connected through harnesses 141-1 and 141-2 in the vehicle-mounted machine 20. In other words, in the vehicle-mounted machine 20, the ECU 101 and the LFI 102 are connected by using harnesses since there is a distance to some extent exists between the position where the ECU 101 is placed and the antennas (such as the doorknob antennas 22-1 and 22-2 and interior antenna 24).

Notably, the harnesses 141-1 and 141-2 are conductive lines having predetermined lengths.

In the figure, the symbols of the resistance, capacitor and coil within the LFI 102 indicate the antennas.

A CPU (Central Processing Unit) 121 of the ECU 101 in FIG. 2 may perform operational processing for performing processing of locking/unlocking a door of the vehicle 1 and/or processing of opening a door or the boot, for example, and output a control signal to a component of the vehicle 1, not shown, properly. The CPU 121 controls a voltage converting section 122 to convert the power supply voltage ("+BAT" in the figure) supplied from the battery of the vehicle to a preset voltage.

The CPU 121 outputs a signal to be transmitted from an antenna onto a signal line 131. The signal output onto the signal line 131 is a signal at 125 kHz resulting from Manchester-encoding and ASK (Amplitude Shift Keying) modulation on the data to be transmitted to the portable machine 10. The CPU 121 outputs the pulse signal corresponding to data and may further include a functional block that performs ASK modulation on the pulse signal.

A driving section 123 in response to the supply of a predetermined power supply voltage from the voltage converting section 122 is configured to drive an FET (Field Effect Transistor) circuit 124 based on the signal output from the CPU 121 and supplied through the signal line 131.

The FET circuit section 124 is configured to output driving current for an antenna to the LFI 102 under the control of the driving section 123. Since the driving section 123 is driven according to the signal at 125 kHz supplied from the CPU 121, the driving current supplied from the FET circuit section 124 to the LFI 102 is also a signal having a period of 125 kHz. Thus, a signal of LF waves is transmitted from an antenna.

The magnitude of the driving current for an antenna, which is output from the FET circuit section 124, is significantly larger than the magnitude of the current of a signal on the signal line 131, for example.

As shown in the figure, a connector terminal 151-2 to which the harness 141-2 is connected is connected to a connector terminal 171 for GND connection along with the GND terminal of the FET circuit 124.

As described above, the harness 141-1 and harness 141-2 are connected to connector terminals 151-1 and 151-2 of the ECU 101 and connecter terminals 152-1 and 152-2 of the LFI 102, respectively. Therefore, the driving current for an antenna, which is output from the FET circuit section 124, directly flows on the harness 141-1.

In this way, in a case where the driving current for an antenna, which is a signal of large current, is passed through a harness, which is an electrically conductive line in a predetermined length, the reactance component and capacitor component present on the harness may cause LC resonance with a signal at a predetermined frequency due to the driving current for an antenna. Then, in a case where LC resonance occurs on the harness, radio noise, which is a signal at a predetermined frequency, is output from the harness. The radio noise may have an influence on operations by an electronic machine such as a car radio installed in the vehicle 1.

Figure 3:
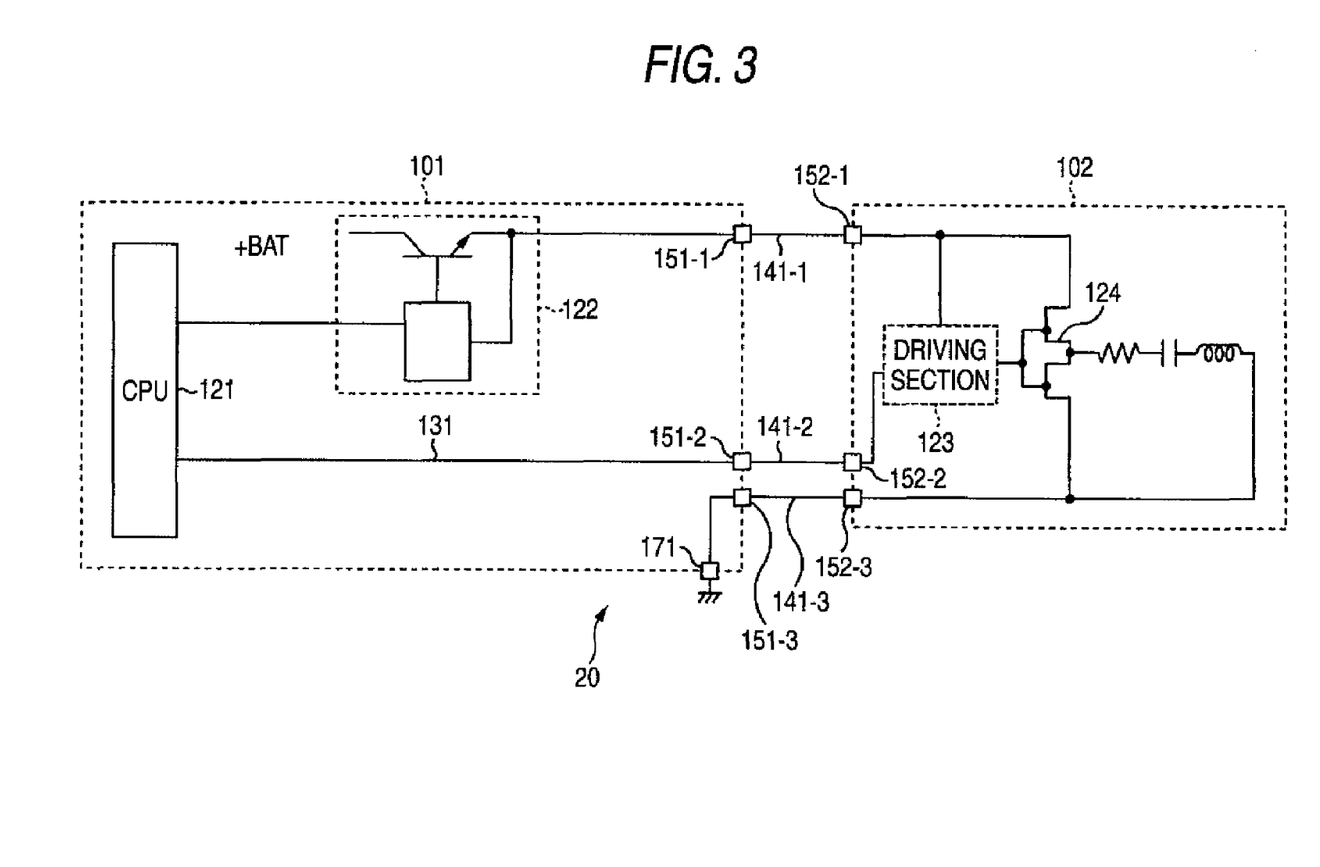
FIG. 3 is a block diagram showing another detail configuration example of the existing vehicle-mounted machine.

In order to suppress the occurrence of radio noise, the vehicle-mounted machine 20 may be configured as shown in FIG. 3, for example.

FIG. 3 is a block diagram showing another detail configuration example of the existing vehicle-mounted machine 20. The same reference numerals are given to the components corresponding to those in FIG. 2. Since the configurations, functions and so on of the components in FIG. 3 corresponding to those in FIG. 2 are the same as those described with reference to FIG. 2, the detail descriptions will be omitted herein. In the example in FIG. 3, the driving section 123 and the FET circuit section 124 are provided within the LFI 102, unlike the case in FIG. 2.

In the example in FIG. 3, a connector terminal 152-3, a harness 141-3 and a connecter terminal 151-3 are provided for connecting the GND terminal of the FET circuit section 124 to the connecter terminal 171 for GND connection.

Configuring the vehicle-mounted machine 20 as shown in FIG. 3 eliminates the necessity for passing the driving current for an antenna (which is significantly large current) output from the FET circuit section 124 through the harness, and current having an equal level of that of the signal on the signal line 131 flows on the harness. Therefore, the occurrence of the radio noise can be suppressed.

However, in the configuration in FIG. 3, the harness 141-3 must be added, which is not necessary in the configuration in FIG. 2. In other words, in order to implement the configuration in FIG. 3, the number of harnesses increases, compared with the case in FIG. 2. Since the increase in number of harnesses may have effect to the structure and/or production costs of the vehicle 1, for example, the number of harnesses is desirably reduced as few as possible in an electronic machine installed in the vehicle 1.

Accordingly, according to the invention, the vehicle-mounted machine 20 with the configuration that can suppress radio noise without increasing the number of harnesses is used.

Figure 4:
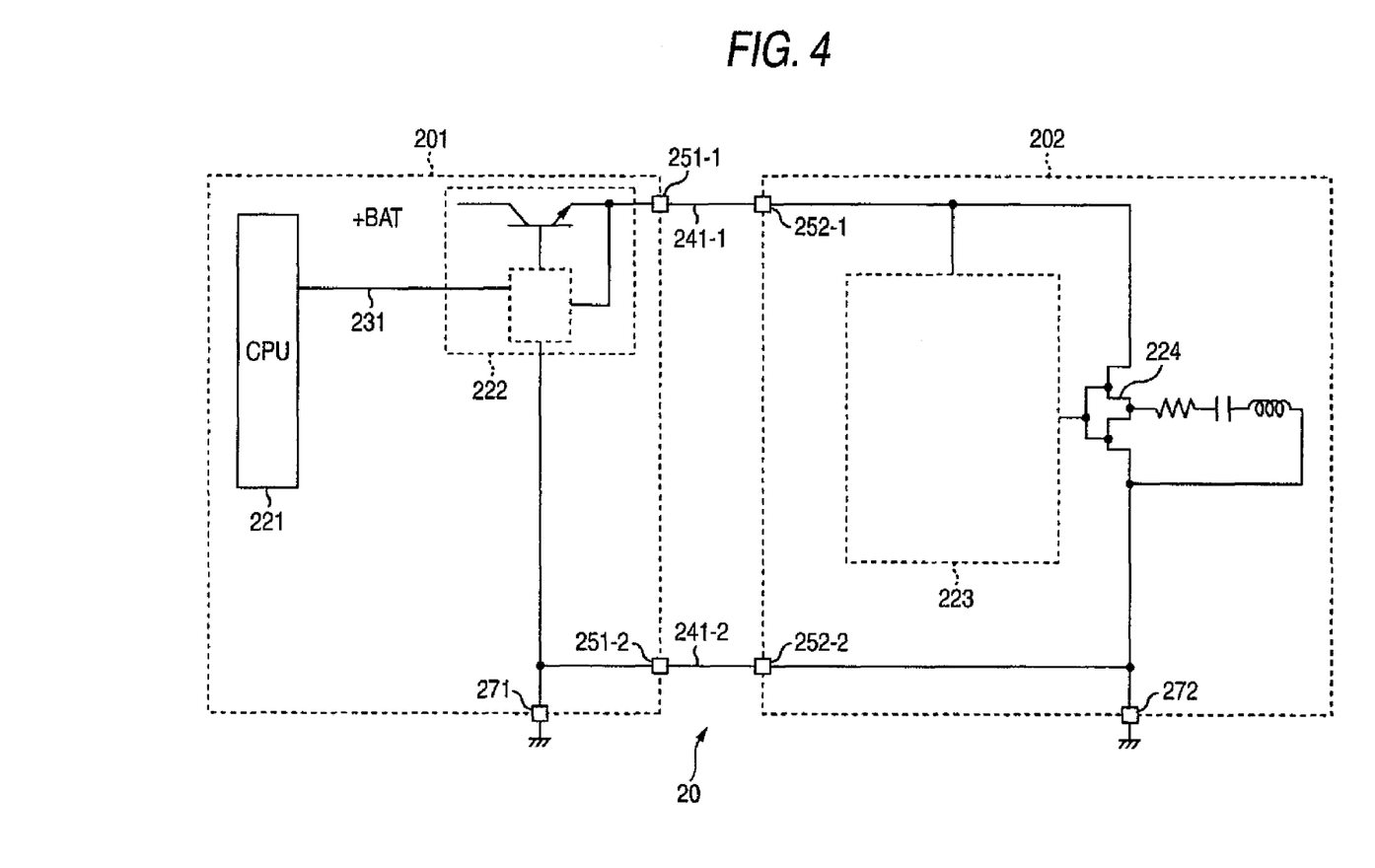
FIG. 4 is a block diagram showing a detail configuration example of a vehicle-mounted machine to which the invention is applied.

FIG. 4 is a block diagram showing a detail configuration example of the vehicle-mounted machine 20 in FIG. 1 to which the invention is applied. As shown in the figure, an ECU 201 (corresponding to the ECU 21 in FIG. 1) on the left side of the figure and an LFI 202 on the right side of the figure are connected through harnesses 241-1 and 241-2 in the vehicle-mounted machine 20. In other words, since there is a distance to some extent between the position where the ECU 201 is placed in the vehicle-mounted machine 20 and antennas (such as the doorknob antennas 22-1 and 22-2 and the interior antenna 24), it is difficult to integrate the ECU 201 and the LFI 202 that drives an antenna. Therefore, the ECU 201 and the LFI 202 are connected through the harnesses 241-1 and 241-2.

Notably, the harnesses 241-1 and 241-2 are conductive lines having predetermined lengths.

In the figure, the symbols of the resistance, capacitor and coil within the LFI 202 indicate the antennas. For symbol description, it is assumed that one antenna is driven by the LFI 202 here.

A CPU (Central Processing Unit) 221 of the ECU 201 may perform operational processing for performing processing of locking/unlocking a door of the vehicle 1 and/or processing of opening a door or the boot, for example, and outputs a control signal to a component of the vehicle 1, not shown, properly The CPU 221 controls a voltage converting section 222 to convert the power supply voltage ("+BAT" in the figure) supplied from the battery of the vehicle to a preset voltage.

In the configuration in FIG. 4, a voltage value control signal functioning as an instruction to change the voltage value supplied from the voltage converting section 222 to the LFI 202 is output from the CPU 221 through a signal line 231. In other words, under the control of the CPU 221, the voltage converting section 222 changes the voltage value to be supplied to the LFI 202. The control signal controls the voltage converting section 222 and is handled as a signal resulting from Manchester-encoding on the data to be transmitted to the portable machine 10, for example.

A driving section 223 is provided in the LFI 202. The driving section 223 is configured as will be described later and is configured to allow outputting a control signal at 125 kHz that drives the FET circuit section 224 as a predetermined Duty Rate (which is a ratio of the period when the voltage value of pulses is a higher value than a threshold value to the period when it is a lower value than the threshold value) or pulses with a predetermined voltage according to the voltage value supplied from the ECU 201. In other words, it is configured that the Duty Rate or voltage of the control signal that drives the FET circuit section 224 changes when the voltage value supplied to the driving section 223 changes.

The driving section 223 in response to the supply of a predetermined power supply voltage from the voltage converting section 222 through a connecter terminal 251-1, the harness 241-1 and a connecter terminal 252-1 detects the voltage value and drives the FET circuit section 224 according to the voltage value.

Figure 5:
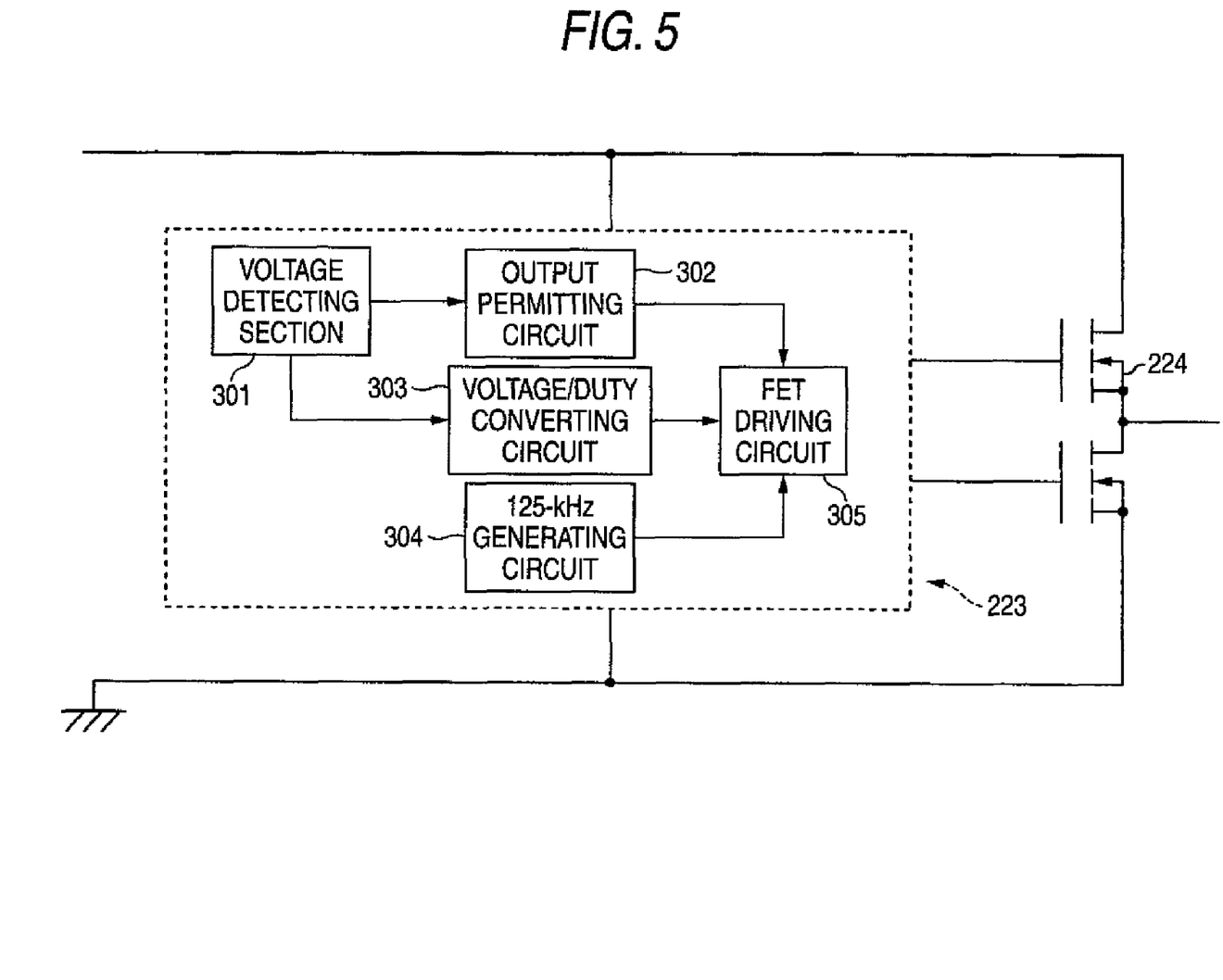
FIG. 5 is a block diagram showing a detail configuration example of the driving circuit in FIG. 4.

The FET circuit section 224 is configured to output driving current for an antenna under the control of the driving section 223. Thus, a signal of LF waves is transmitted from the antenna. The FET circuit 224 is configured by a combination of two FETs in reality, as shown in FIG. 5. The magnitude of the driving current for an antenna, which is output from the FET circuit section 224, is significantly larger than the magnitude of the current of a signal on the harness 241-1 or 241-2, for example.

As shown in FIG. 4, a connector terminal 251-2 connecting to the harness 241-2 is connected to a connector terminal 271 for GND connection along with the GND terminal of the voltage converting section 222. A connecter terminal 252-2 connecting to the harness 241-2 is connected to a connecter terminal 272 for GND connection along with the GND terminal of the FET circuit section 224. In other words, in the configuration in FIG. 4, the GND terminal for the FET circuit section 224 can be grounded on the LFI 202 side. For example, as described above with reference to FIG. 3, the harness (such as the harness 141-3 in FIG. 3) for grounding the GND terminal of the FET on the ECU side is not necessary.

In the configuration in FIG. 4, the occurrence of radio noise due to LC resonance with a signal at a predetermined frequency due to the driving current for an antenna is suppressed since it is not necessary to pass the driving current for an antenna, which is a signal of large current, through a harness, which is a conductive line in a predetermined length. Furthermore, in the configuration in FIG. 4, the harnesses connecting the ECU 201 and the LFI 202 may be two of the harness 241-1 and harness 241-2 since the GND terminal of the FET circuit section 224 is connected to the connector terminal 272 of the LFI 202. Thus, the increase in number of harnesses can be suppressed.

FIG. 5 is a block diagram showing a detail configuration example of the driving section 223 in FIG. 4. In the figure, the part surrounded by the broken line corresponds to the driving section 223 in FIG. 4.

A voltage detecting section 301 detects the voltage value supplied from the voltage converting section 222 to the LFI 202 and outputs the signal corresponding to the voltage value to an output permitting circuit 302 and a voltage/Duty converting circuit 303. The voltage detecting section 301 may, for example, compare the voltage value supplied from the voltage converting section 222 to the LFI 202 with a preset reference voltage. If the voltage supplied from the voltage converting section 222 to the LFI 202 is higher than the reference voltage, the signal corresponding to the information describing the fact is output to the output permitting circuit, and the signal corresponding to the information describing how much higher the voltage value supplied from the voltage converting section 222 to the LFI 202 is than the reference voltage is output to the voltage/Duty converting circuit 303.

The output permitting circuit 302 determines whether the voltage value supplied from the voltage converting section 222 to the LFI 202 is higher than the reference voltage or not based on the signal supplied from the voltage detecting section 301. If the voltage value supplied from the voltage converting section 222 to the LFI 202 is higher than the reference voltage, for example, the output permitting circuit 302 outputs a control signal that drives the FET driving circuit 305. If the voltage value supplied from the voltage converting section 222 to the LFI 202 is equal to or lower than the reference voltage, the output permitting circuit 302 outputs a control signal that does not drive (or stops) the FET driving circuit 305.

The voltage/Duty converting circuit 303 determines how much higher the voltage value supplied from the voltage converting section 222 to the LFI 202 is than the reference voltage based on the signal supplied from the voltage detecting section 301. The voltage/Duty converting circuit 303 is configured to control the FET driving circuit 305 to change the Duty Rate or voltage of the control signal (drive signal) that drives the FET circuit section 224, which is output by the FET driving circuit 305, according to the height of the voltage value.

The FET driving circuit 305 is driven or stopped based on the control signal supplied from the output permitting circuit 302 and generates and outputs a drive signal for the FET circuit section 224 based on the signal at a frequency of 125 kHz generated by a 125-kHz generating circuit 304 in a period when the FET driving circuit 305 is being driven. Therefore, the drive signal may be a signal at 125 kHz resulting from pulse modulation, encoding and ASK (Amplitude Shift Keying) modulation on the signal (which is a signal indicating whether the voltage value supplied from the voltage converting section 222 to the LFI 202 is higher than the reference voltage or not) supplied from the voltage detecting section 301, for example. The FET driving circuit 305 changes the Duty Rate or voltage of the drive signal output by the FET driving circuit 305 under the control of the voltage/Duty converting circuit 303.

In other words, in a case where the voltage value supplied from the voltage converting section 222 to the LFI 202 is equal to or lower than the reference voltage, the FET driving circuit 305 does not output the drive signal. On the other hand, if the voltage value supplied from the voltage converting section 222 to the LFI 202 is higher than the reference voltage, the FET driving circuit 305 outputs a drive signal at a frequency of 125 kHz to the FET circuit section 224 with the Duty Rate or voltage according to the voltage value supplied from the voltage converting section 222 to the LFI 202. As described above, the PET circuit section 224 outputs the driving current for an antenna to the LFI 202 under the control of the driving section 223. Thus, a signal at 125 kHz is output as LF waves from the antenna.

In this way, the operation of the driving section 223 is controlled by the voltage value supplied from the voltage converting section 222 to the LFI 202. Thus, by performing pulse modulation on the data to be transmitted to the portable machine 10, controlling the voltage converting section 222 properly such that the CPU 221 can support the pulses and changing the voltage value to be output by the voltage converting section 222 at a predetermined time in the ECU 201, for example, the signal resulting from ASK modulation on the data to be transmitted to the portable machine 10 can be output from the antenna in the LFI 202.

In this way, with the vehicle-mounted machine 20 shown in FIG. 4, the occurrence of radiation noise due to LC resonance with a signal at a predetermined frequency due to the driving current for an antenna can be suppressed, and the increases in number of harnesses can be suppressed, without requiring passing the driving current for an antenna, which is a signal of large current, through a harness, which is a conductive line in a predetermined length. Furthermore, the Duty Rate or voltage of the signal to be output from an antenna can be changed as required.

As a result, according to the invention, communication with less noise can be implemented in performing the communication between the vehicle-mounted machine 20 and the portable machine 10, without increasing the number of harnesses.

Figure 6:
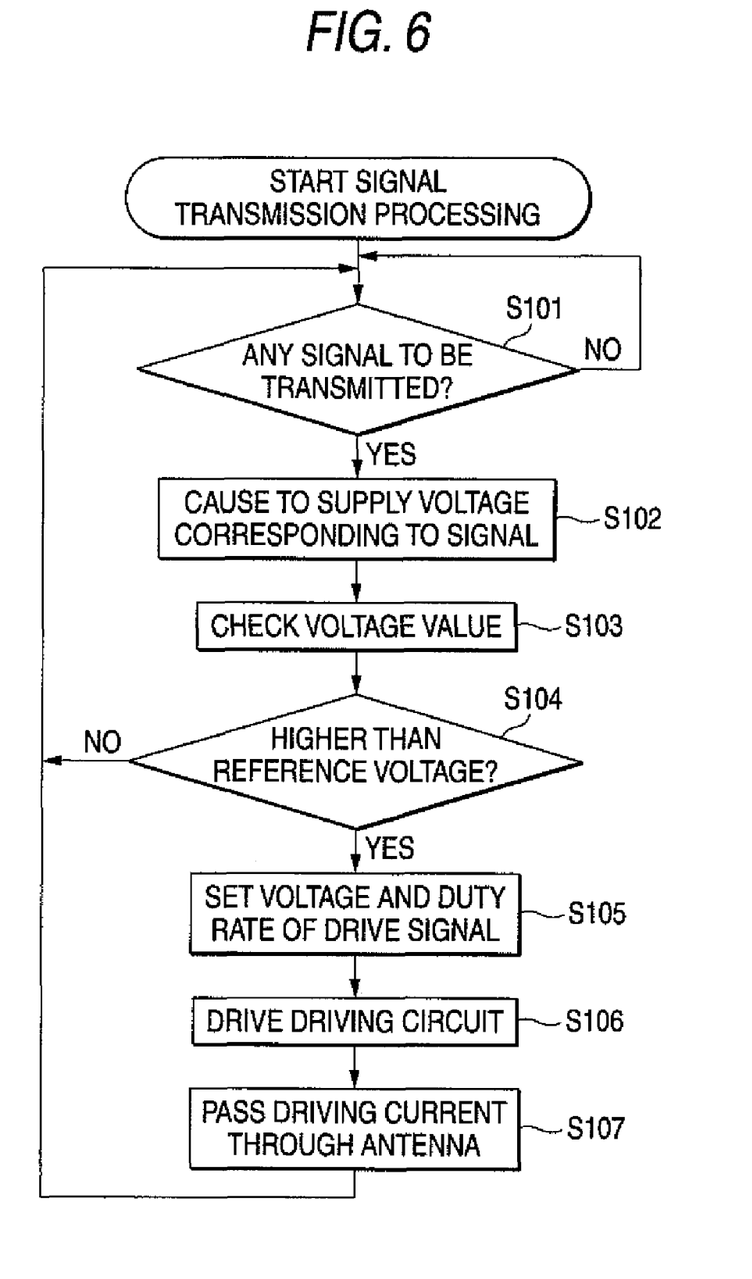
FIG. 6 is a flowchart describing signal transmission processing.

Next, with reference to the flowchart in FIG. 6, signal transmission processing by the vehicle-mounted machine 20 in FIG. 4 will be described.

In step S101, the CPU 221 determines whether any information to be transmitted to the portable machine 10, for example, exists or not and awaits the determination that some information to be transmitted exists. If it is determined in step S101 that some information to be transmitted exists, the processing moves to step S102.

In step S102, the CPU 221 causes the voltage converting section 222 to supply the LFI 202 the voltage corresponding to the signal determined as being to be transmitted in the processing in step S101. At that time, the voltage value to be supplied from the voltage converting section 222 to the LFI 202 is changed so as to form the pulses corresponding to the signal, and the voltage is supplied from the voltage converting section 222 to the LFI 202 such that the voltage value can be the value corresponding to the Duty Rate or voltage of the signal to be transmitted.

In step S103, the voltage detecting section 301 checks the voltage value supplied from the voltage converting section 222.

In step S104, the voltage detecting section 301 determines whether the voltage value checked in the processing in step S103 is higher than a preset reference voltage or not. If it is determined that the voltage value checked in the processing in step S103 (the voltage value supplied from the voltage converting section 222 to the LFI 202) is higher than the preset reference voltage, the voltage detecting section 301 outputs the signal corresponding to the information describing the fact to the output permitting circuit 302 and outputs the signal corresponding to the information describing how much higher the voltage value supplied from the voltage converting section 222 to the LFI 202 is than the reference voltage to the voltage/Duty converting circuit 303. Then, the processing moves to step S105.

In step S105, the voltage/Duty converting circuit 303 determines how much higher the voltage value supplied from the voltage converting section 222 to the LFI 202 is than the reference voltage based on the signal supplied from the voltage detecting section 301. The voltage/Duty converting circuit 303 controls (or sets) the FET driving circuit 305 to change the Duty Rate or voltage of the control signal (drive signal) that drives the FET circuit section 224, which is output by the FET driving circuit 305, according to the height of the voltage value.

In step S106, the output permitting circuit 302 outputs a control signal that drives the FET driving circuit 305.

In step S107, the FET driving circuit 305 generates and outputs the driving signal for the FET circuit section 224 based on the signal at a frequency of 125 kHz, which is generated by a 125-kHz generating circuit 304. As a result, the FET circuit section 224 outputs the driving current for an antenna under the control of the driving section 223.

On the other hand, if it is determined in step S104 that the voltage value checked in the processing in step S103 (the voltage value supplied from the voltage converting section 222 to the LFI 202) is lower than the preset reference voltage the voltage detecting section 301 outputs the signal corresponding to the information describing the fact to the output permitting circuit 302. In this case, the output permitting circuit 302 does not output the driving current for an antenna since the FET driving circuit 305 is not driven.

If it is determined after the processing in step S107 or in step S104 that the voltage value checked in the processing in step S103 (the voltage value supplied from the voltage converting section 222 to the LFI 202) is lower than the preset reference voltage, the processing returns to step S101, and subsequent processing is repeatedly performed.

Then, the driving current of the signal at 125 kHz resulting from ASK modulation on the signal corresponding to the change in voltage supplied from the voltage converting section 222 to the LFI 202 in the processing in step S102 is supplied to an antenna in the processing in step S107, and the LF waves corresponding to the signal is transmitted from the antenna (such as the doorknob antenna 22-1 and 22-2 and the interior antenna 24).

In this way, the signal is transmitted from the antenna.

What is claimed is:

1. A transmitting apparatus comprising a control section and an antenna driving section connecting to the control section, and transmitting an LF signal from the antenna by controlling the antenna driving section by the control section,
    the control section comprising:
        voltage control means for outputting a control signal based on a signal to be transmitted; and
        voltage supplying means for supplying a predetermined voltage to the antenna driving section for a predetermined period of time based on a control signal output from the voltage control means,
    the antenna driving section comprising:
        a transistor that outputs driving current to the antenna; and
        transistor driving control means for controlling the driving of the transistor based on the value of the voltage supplied from the voltage supplying means,
    wherein the control section is connected to the antenna driving section only by a first harness and a second harness,
    wherein the first harness connects the voltage supplying means and the transistor driving control means, and
    wherein the second harness connects a ground side of the voltage supplying means and a ground side of the transistor.

2. The transmitting apparatus according to claim 1, the transistor driving control means comprising:
    voltage Duty control means for controlling the driving of the transistor to change the Duty Rate or voltage of the signal to be transmitted from the antenna based on the value of the voltage supplied from the voltage supplying means through the first harness,
    wherein the voltage control means causes the voltage supplying means to supply the antenna driving section voltage corresponding to the Duty Rate or voltage of the signal to be transmitted from the antenna.

3. The transmitting apparatus according to claim 2, wherein the transistor driving control means performs ASK (Amplitude Shift Keying) modulation on the signal corresponding to the change in value of the voltage supplied from the voltage supplying means based on the signal supplied from a signal generating section that generates a signal at a preset frequency.

4. A transmitting method of transmitting an LF signal from an antenna by controlling an antenna driving section connecting to a control section by the control section,
    the control section comprising:
        voltage control means for outputting a control signal based on a signal to be transmitted; and
        voltage supplying means for supplying a predetermined voltage to the antenna driving section for a predetermined period of time based on a control signal output from the voltage control means,
    the antenna driving section comprising:
        a transistor that outputs driving current to the antenna; and
        transistor driving control means for controlling the driving of the transistor based on the value of the voltage supplied from the voltage supplying means, wherein the control section is connected to the antenna driving section only by a first harness and a second harness, wherein the first harness connects the voltage supplying means and the transistor driving control means, and wherein the second harness connects a ground side of the voltage supplying means and a ground side of the transistor, said method comprising:

supplying a predetermined voltage by the control section to the antenna driving section for a predetermined period of time based on the signal to be transmitted; and controlling the driving of the transistor by the antenna driving section based on the value of the voltage supplied from the voltage supplying means through the first harness.

* * * * *